2,874,194
Patented Feb. 17, 1959

United States Patent Office

2,874,194

ELASTIC HIGH MOLECULAR WEIGHT HYDROXYL GROUP CONTAINING MATERIALS

Helmut Kolling, Duisburg-Hamborn, and Friedrich Rappen, Oberhausen-Sterkrade, Germany, assignors to Ruhrchemie Aktiengesellschaft, Oberhausen-Holten, Germany No Drawing. Application March 15, 1954
Serial No. 416,378

Claims priority, application Germany March 18, 1953

1 Claim. (Cl. 260—638)

This invention relates to and has as its object the production of elastic high molecular weight materials.

It is known to treat high molecular weight hydrocarbons containing more than 20 carbon atoms in the molecule and being in the form of high melting natural or synthetic paraffins, especially of paraffins from Fischer-Tropsch synthesis, with chlorine, to subsequently split off and hydrogen chloride, to catalytically react the resulting unsaturated hydrocarbon mixtures with carbon monoxide and hydrogen in accordance with the Oxo synthesis (oxonate) and to hydrogenate the same. For the production of products having beeswax-like through petrolatum-like properties, this process has, so far, practically only been applied to paraffins which contain 20–33 carbon atoms in the molecule, and not more than 3 gram atoms chlorine per molecule of hydrocarbon have been added. This resulted in alcohol paraffin mixtures which had a good emulsifying capacity, and which due to their consistency were particularly well suited for the preparation of ointment bases.

It has now, very surprisingly, been found that it is possible, by the conventional chlorination, dehydrochlorination, oxonation and hydrogenation of natural and synthetic paraffins to obtain high molecular weight materials of elastic properties, if hydrocarbon mixtures are processed which contain an average of more than 40 carbon atoms in the molecule, and if 4–6 gram atoms chlorine per molecule of hydrocarbon are added. The hydrocarbon mixtures may be of natural or synthetic source. It is particularly advantageous to use hydrocarbon mixtures having more than 40 carbon atoms and produced by the catalytic hydrogenation of carbon monoxide using iron catalysts.

In effecting the process, according to the invention, hydrocarbon fractions, the average carbon number of which is above $C_{40}$, and preferably the carbon monoxide hydrogenation products mentioned above, are at first treated with gaseous chlorine at temperatures ranging about 10–20° C. in excess of their melting point while stirring and preferably while irradiating, until 4–6 gram atoms chlorine are absorbed per mol hydrocarbon.

Following this, hydrogen chloride is split off in a stirring vessel by heating for 3–6 hours at about 300° C. preferably between 280–320° C. In so doing, it is of advantage to introduce small amounts of nitrogen and to add 1–2% active carbon to the reaction mixture. Moreover, after-treatment with zinc oxide and bleaching earth at about 200° C. in the known manner, is of advantage in order to remove the last residues of chlorine compounds.

The high olefin-containing hydrocarbon mixtures formed by the dehydrochlorination are subjected, in the conventional manner, to the Oxo synthesis and to a subsequent hydrogenation. The catalysts used for the Oxo synthesis are the conventional cobalt catalysts as, for example, carbon monoxide hydrogenation catalysts, or preferably aqueous cobalt sulfate solutions. The reaction temperatures are maintained at 140–160° C. and the gas pressures at 100–200 kg./sq. cm. As contrasted with the oxonation of unsaturated paraffin mixtures having a low olefin content, which is generally terminated after a reaction time of 1 hour, the processing of the starting materials used in accordance with the invention requires a longer time as, for example, 3–6 hours.

Cobalt-containing catalysts may be used for the hydrogenation which follows the addition of the $CO-H_2$ gas. Other hydrogenation catalysts such as nickel catalysts, may also be used. The hydrogenation is effected within about 60–120 minutes at pressures of 50–200 kg./sq. cm. and at temperatures of 120–220° C. It may be of advantage if small amounts of water are present during the hydrogenation.

After the hydrogenation, the reaction product is filtered off from the catalyst. The filtration, if necessary or desired, may be effected with the addition of solvents.

As contrasted with the products which were obtained by the conventional chlorination, dehydrochlorination, oxonation and hydrogenation of high melting paraffin hydrocarbons, the products obtained, in accordance with the invention, are very surprisingly of a fundamentally different character. The new products are by no means of beeswax-like or petrolatum-like consistency, but are solid, non-sticky materials which, without being plastic, have a high elasticity. They have a relatively high dropping point. In contrast to paraffins and the products hitherto recovered by chlorination, dehydrochlorination, oxonation and hydrogenation, they are extremely viscous even in the melted state.

The high molecular weight materials prepared in accordance with the invention may be mixed in any proportion with natural or synthetic waxes. This property is of particular advantage for high melting hard paraffins from catalytic carbon monoxide hydrogenation because an extremely high flexibility may be imparted to these inherently brittle paraffins by means of the new products. This is the case even with the residues boiling above 110° C. which are obtained by extraction of hard paraffin. It is now possible by means of the products, in accordance with the invention, to produce flexible and nevertheless very high melting paraffins.

The materials, according to the invention, and their mixtures with waxes or high melting paraffins are excellently suited for coating paper or metals. If, for example, a thin metal sheet is coated with the melt of a material of this kind, there results an extremely firmly adhering coating which will not be damaged even when collapsing the metal sheet.

The properties of the high molecular weight products produced in accordance with the invention, may be varied within more or less wide limits by extraction with solvents. Suitable solvents include hydrocarbons, chlorinated hydrocarbons or oxygenated carbon compounds as, for example, heptane, dichlorethane, methanol, acetone or methylethylketone. The extractions are effected at temperatures between 20–60° C., preferably at temperatures between 20–30° C. It is generally sufficient to stir up the products for a short time with 2 to 5 times their quantity of solvent and to separate the extract from the extraction residue by filtration. In general, 5–30% and preferably 10–20% of the quantity of material charged is dissolved out in extractions of this kind. The residue represents a rubber-like finished product which is insoluble in most solvents.

It is of particular advantage to previously divide the quantity of material to be extracted as finely as possible. This state may be reached, for example, by spraying the molten substance. In this way, there is formed a cobweb-like, non-sticky structure of fine filaments. This procedure distinctly shows the different physical character of the products produced in accordance with the invention. Under the same spraying conditions, when processing paraffins or wax-like or petrolatum-like alcohol-paraffin mixtures, there are obtained pulverulent, smeary or sticky products, but no filamentous structures, as are obtained by spraying the high molecular weight materials produced, in accordance with the invention.

The following examples are given by way of illustration and not limitation:

*Example 1*

A paraffin produced by catalytic carbon monoxide hydrogenation on iron catalysts, boiling between 440 and 520° C., and having a solidification point of 72° C., and an average carbon number of $C_{32}$, was chlorinated at about 80–90° C., while irradiating, until 4 gram atoms chlorine had been absorbed per mol hydrocarbon. The chlorinated paraffin was mixed with 1% active carbon and heated for 6 hours at about 300° C. in a glass flask while stirring and passing through small amounts of nitrogen. After cooling of the reaction mixture, a mixture of 1% zinc oxide and 1% bleaching earth (Tonsil) was added. The mixture was then heated for an additional 2 hours at about 200° C. After having filtered off the solid constituents, there was obtained a product which had an iodine number of 112 and a chlorine content of 0.3%.

The olefinic hydrocarbon mixture was reacted with water gas for 4 hours at 140–160° C. and a pressure of 180–200 kg./sq. cm. in the presence of a cobalt catalyst in a pressure vessel provided with a stirrer. The aldehydes obtained by the oxonation were treated for 1 hour at 200–220° C. and a pressure of 140–150 kg./sq. cm. with hydrogen using the same catalyst as that used in the water gas addition. After having filtered off the cobalt catalyst, there was obtained a yellow product which had a hydroxyl number of 92 and a solidification point of 51° C. This product was of viscous, petrolatum-like condition.

*Example 2*

Hard paraffin from Fischer-Tropsch synthesis which contained all of the hydrocarbons boiling above 460° C. and had an average carbon number of $C_{48}$ and a solidification point of 98° C. was chlorinated at about 110–120° C. while irradiating, until 2 gram atoms chlorine had been absorbed per mol hydrocarbon. The dehydrochlorination and residual dechlorination with zinc oxide and bleaching earth was effected in the manner described in Example 1. The olefin-containing hydrocarbon mixture which had an iodine number of 45 and contained still 0.2% Cl was treated with water gas and hydrogen in accordance with Example 1 and filtered. As the finished product, there was obtained a light yellow, beeswax-like product which had a hydroxyl number of 55 and a solidification point of 81° C.

*Example 3*

The hard paraffin used in Example 2 was treated with chlorine while irradiating, until 4 gram atoms chlorine had been absorbed per mol hydrocarbon. After splitting-off of hydrogen chloride and after-treatment with zinc oxide and bleaching earth, there remained an olefinic hydrocarbon mixture which contained 0.4% chlorine and had an iodine number of 105. The reaction conditions in the subsequent oxonation and hydrogenation were the same as those in Example 1. The reaction time, however, was 6 hours.

After the separation of the catalyst, there remained a yellowish finished product which had a hydroxyl number of 65 and a dropping point of 140–150° C. When subjecting it to a temperature of about 190° C., a clear melt was obtained. In the solidified state, it was neither sticky nor plastic, but had a high elasticity like rubber. These properties, as contrasted to Examples 1 and 2, were obtained in accordance with the invention, by processing a starting material having an average carbon number of $C_{48}$ and by adding a quantity of chlorine of more than 3 gram atoms per mol hydrocarbon.

*Example 4*

The hard paraffin used in Example 2 and having an average carbon number of $C_{48}$ was chlorinated, while irradiating, until 5 gram atoms chlorine had been absorbed per mol hydrocarbon. By dehydrochlorination and after-treatment with zinc oxide and bleaching earth, there was obtained an olefinic paraffin mixture having an iodine number of 115 and a residual content of chlorine of 0.5%. The Oxo synthesis and the subsequent hydrogenation were effected in accordance with Example 3. The finished product thereby formed could not be filtered off from the catalyst without decomposition. To separate the catalyst, the product was stirred up at 160–180° C. with 5 times its quantity of a saturated $C_{10}$ hydrocarbon thereby completely dissolving it, while the catalyst settled at the bottom of the stirring vessel. After having filtered off the catalyst, the $C_{10}$ hydrocarbon added was distilled off under vacuum. As the finished product, there remained a yellowish-brown, highly elastic material which had a dropping point of above 160° C. In contrast to Example 2, these properties were obtained in accordance with the invention, by increasing the addition of chlorine from 2 gram atoms chlorine to 5 gram atoms chlorine per mol hydrocarbon.

*Example 5*

A finished product produced in accordance with Example 3, was melted and sprayed at about 180° C. with nitrogen. This spraying resulted in a cobweb-like, non-sticky structure of fine filaments. The product from spraying was stirred for 30 minutes at about 20° C. with 3 times its quantity of ethylene chloride and filtered off from the extraction residue. This extraction resulted in an extract which comprised about 20% of the quantity charged. As the extraction residue, there remained a light brown rubber-like product which was insoluble in most organic solvents.

We claim:

An elastic high molecular weight hydroxyl group containing material formed by chlorinating with 4–6 gram atoms of chlorine per mole a hard paraffin having a boiling point above 440° C., having a solidification point of about between 70 and 100° C., an average of more than 40 carbon atoms in the molecule and produced by catalytic carbon monoxide hydrogenation heating the chlorination product to a temperature sufficient to split off the chlorine added as hydrogen chloride, catalytically adding carbon monoxide and hydrogen to the unsaturated hydrocarbon formed in accordance with the oxo-synthesis at a temperature of 140–160° C. at a gas pressure between 100–200 kg./sq. cm. in the presence of a cobalt catalyst for about 3–6 hours, and thereafter hydrogenating the product.

References Cited in the file of this patent

UNITED STATES PATENTS 2,682,523   Talley et al. _____ June 29, 1954

FOREIGN PATENTS 862,746   Germany _____ Jan. 12, 1953
866,339   Germany _____ Feb. 9, 1953

OTHER REFERENCES

Morton: Laboratory Technique in Organic Chemistry, 1st edition, 1938, pp. 195 to 197.

Storch et al.: The Fischer-Tropsch and Related Syntheses, 1951, pages 386, 387 and 449.

Groggins: "Unit Processes," 4th ed. (1952), McGraw-Hill, N. Y., pp. 560, 564–78.

McElvain: "Characterization of Organic Compounds," MacMillan, N. Y., 1953.

Mitchell et al.: "Organic Analysis," vols. I and II, Interscience, N. Y., 1953.